United States Patent [19]

Chang

[11] Patent Number: 5,329,919
[45] Date of Patent: Jul. 19, 1994

[54] EXPANSIBLE CYCLONE STOVE

[76] Inventor: Kwei T. Chang, No. 14, Lane 54, Luong Chuan St., Panchiao City, Taipei Hsien, Taiwan

[21] Appl. No.: 955,782

[22] Filed: Oct. 2, 1992

[51] Int. Cl.⁵ ............................................. F24C 1/16
[52] U.S. Cl. ................................ 126/275 E; 126/21 A; 126/275 R; 219/400; 219/402; 99/339; 99/474; 99/330
[58] Field of Search .............. 126/21 R, 21 A, 275 R, 126/273 E; 219/400, 402, 404, 401; 99/330, 448, 449, 450, 476, 474, 400, 339, 340, 447

[56] References Cited

U.S. PATENT DOCUMENTS

| | | | |
|---|---|---|---|
| 2,523,796 | 9/1950 | Weeks . | |
| 3,586,516 | 6/1971 | Terc . | |
| 4,286,456 | 9/1981 | Sisti et al. | 219/400 X |
| 4,295,034 | 10/1981 | Assmann | 219/400 |
| 4,350,874 | 9/1982 | Nishikawa | 219/400 |
| 4,536,643 | 8/1985 | Erickson | 219/400 |
| 4,581,989 | 4/1986 | Swartley | 99/346 |
| 4,591,698 | 5/1986 | Chang | 219/400 |
| 4,817,509 | 4/1989 | Erickson | 219/400 X |
| 5,047,610 | 9/1991 | Chang | 219/400 |
| 5,165,328 | 11/1992 | Erickson | 126/21 A X |
| 5,245,159 | 9/1993 | Chang | 219/400 |

FOREIGN PATENT DOCUMENTS

| | | | |
|---|---|---|---|
| 119429 | 9/1981 | Japan | 219/400 |
| 2102561 | 2/1983 | United Kingdom | 219/400 |

*Primary Examiner*—Larry Jones
*Attorney, Agent, or Firm*—Lowe, Price, LeBlanc & Becker

[57] ABSTRACT

An expansible cyclone stove includes an expansible mount fastened to a stove body thereof to hold a lid for permitting the lid to be adjusted upwards from the stove body to increase the holding space for holding a cooking container inside the stove body. The expansible mount is consisted of an angle frame fastened to the stove body, and a connecting block pivoted to a handle on the lid and having a bottom extension inserted in a chamber on the angle frame and locked in either upper limit or lower limit position by a screw and a locknut.

3 Claims, 8 Drawing Sheets

EXPANSIBLE CYCLONE STOVE

BACKGROUND OF THE INVENTION

The present invention relates to a cyclone stove and relates more particularly to such a cyclone stove which can be conveniently adjusted to increase its holding space for holding additional cooking containers.

Various cyclone stoves are known and widely in use. However, once a cyclone stove was made, its holding space is fixed. Therefore, for cooking a bigger quantity of foods through a cyclone stove, the foods may have to be separated into two or more lots for cooking separately.

SUMMARY OF THE INVENTION

The present invention has been accomplished under the aforesaid circumstances. It is therefore the main object of the present invention to provide an expansible cyclone stove which can be conveniently adjusted to increase its holding space for holding additional cooking containers for cooking more foods. It is another object of the present invention to provide an expansible cyclone stove which is easy to assemble.

According to the preferred embodiment, the expansible cyclone stove is comprised of a lid, which has a control panel and a transverse handle on the top and a hot air fan on the bottom covered with a covering, a stove body, which has a handhold and a side block fastened to an outside ring thereof, and an expansible mount fastened to the side block of the stove body to hold the handle of the lid for permitting the lid to be lifted from the stove body or closed thereon. The expansible mount is consisted of an angle frame fastened to the side block of the stove body by screws, and a connecting block pivoted to the handle of the lid by two bushings and a screw and locknut set and having a bottom extension inserted in a chamber on the angle frame and locked in either upper limit or lower limit position by a screw and a locknut. By locking the connecting block in the upper limit position, the lid is spaced above the stove body, and therefore the holding space of the stove body is increased.

DETAILED DESCRIPTION OF THE PREFERRED EMBODIMENT

Figure 1:
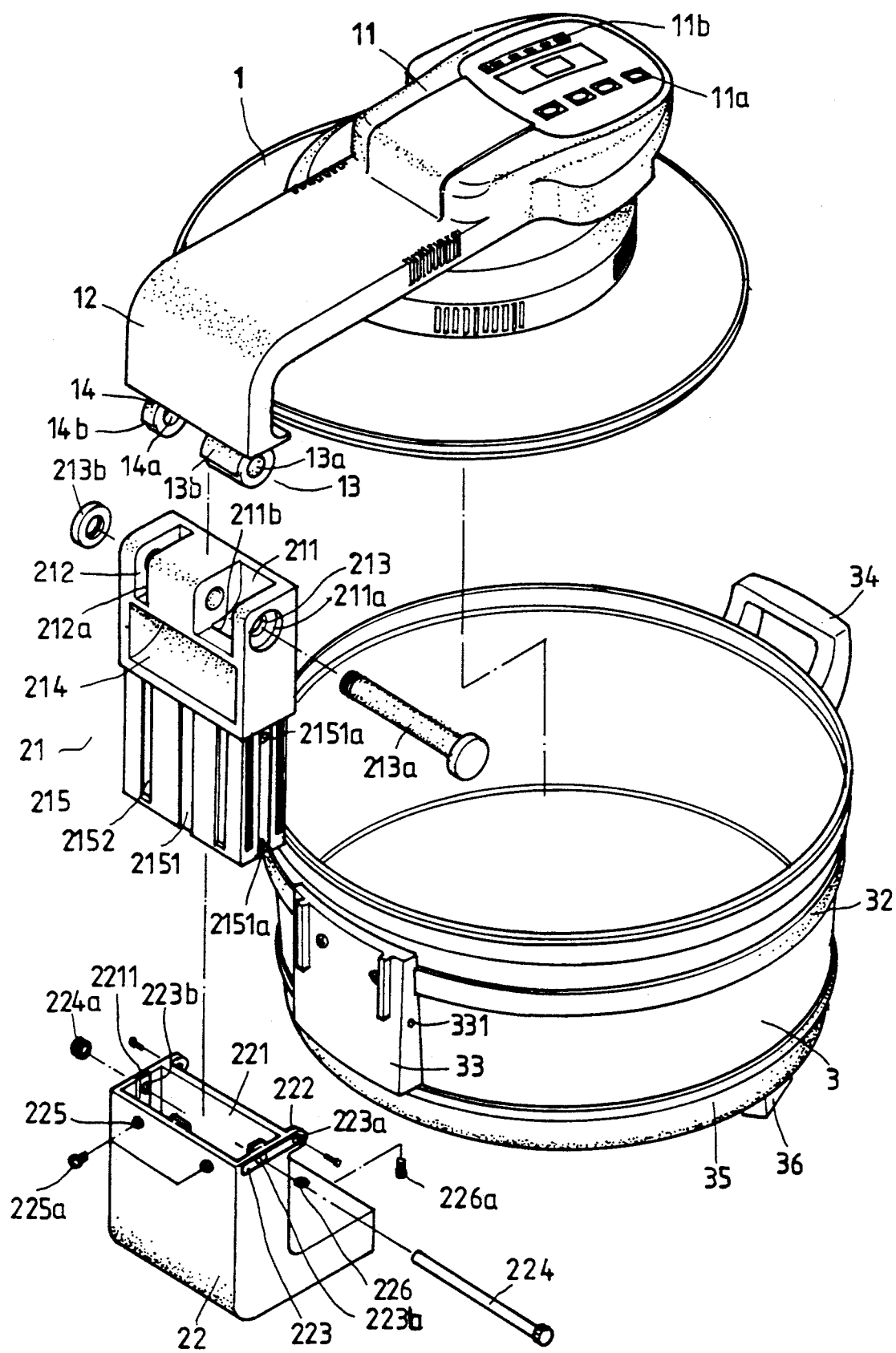
FIG. 1 is an exploded view of an expansible cyclone stove embodying the present invention.
Figure 2:
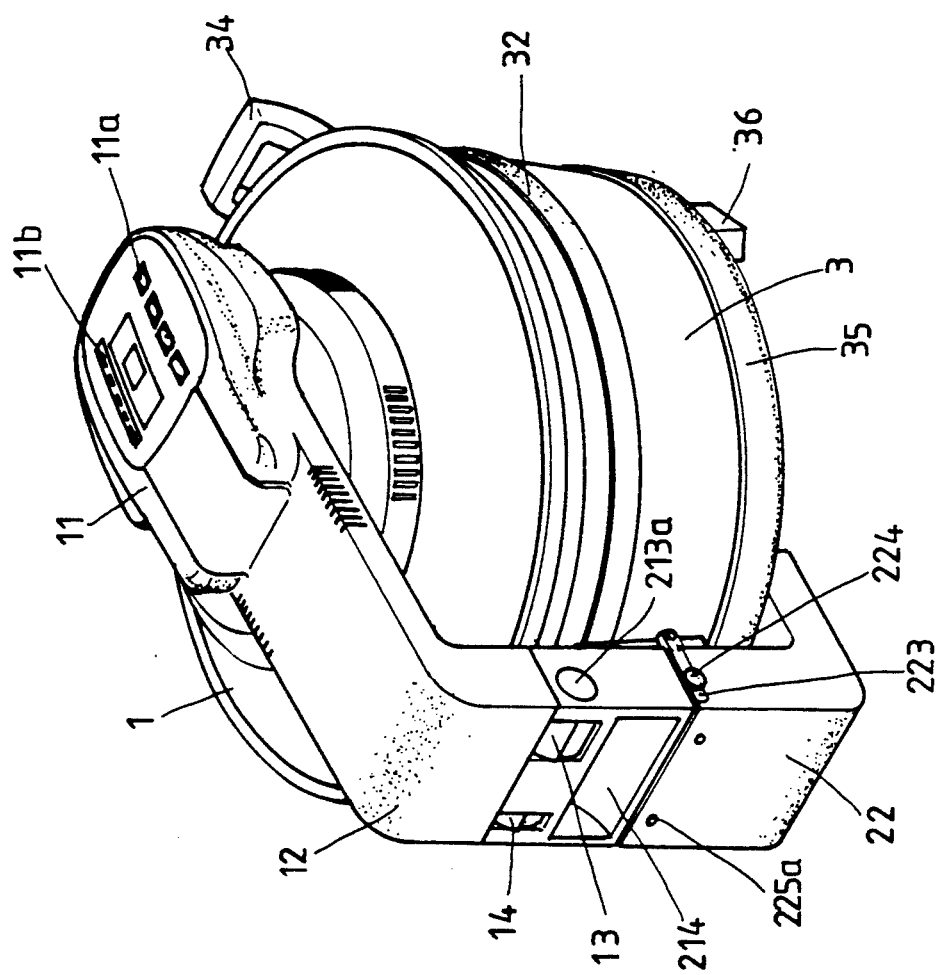
FIG. 2 is an elevational view thereof.
Figure 3:
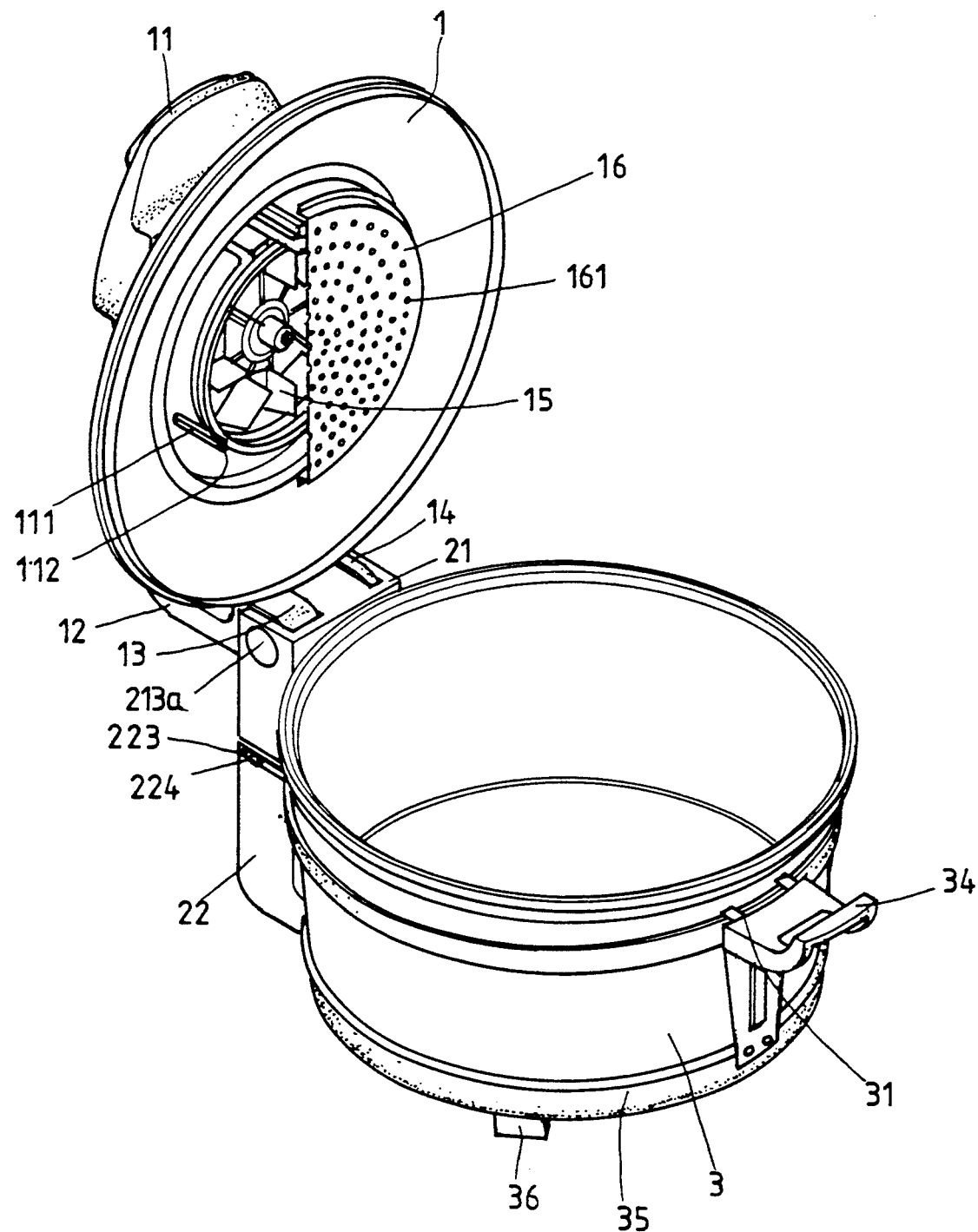
FIG. 3 is a perspective view thereof showing the lid opened.
Figure 4B:
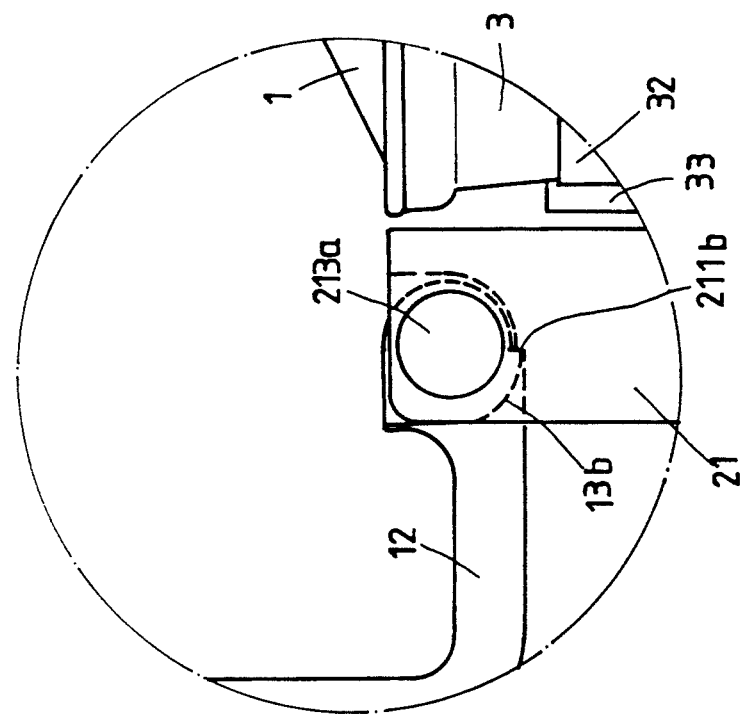
FIG. 4A is a fragmentary detailed view of the position of the handle on the expansible mount when the lid is closed and FIG. 4B is a view similar to FIG. 4A showing the position of the handle when the lid is open.
Figure 4A:
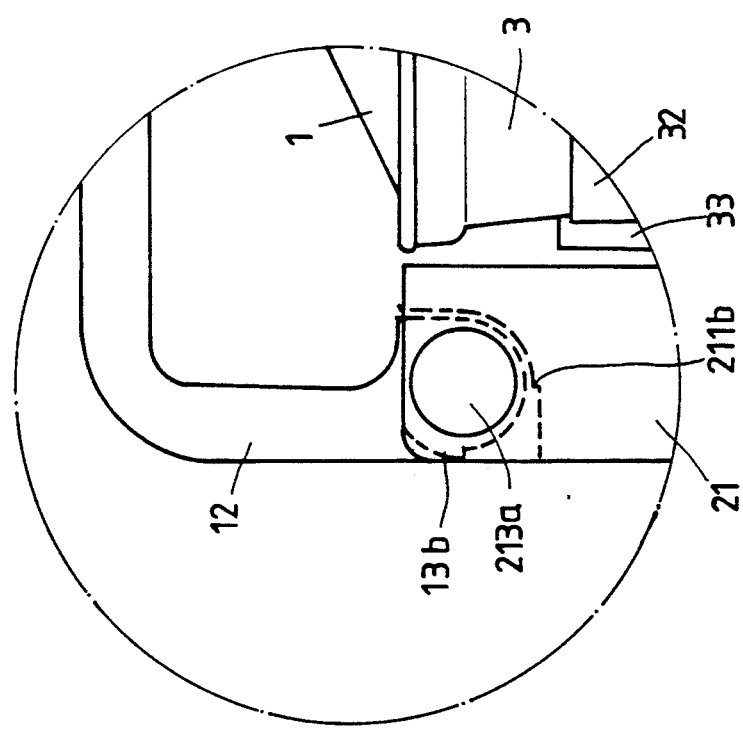
Figure 5:
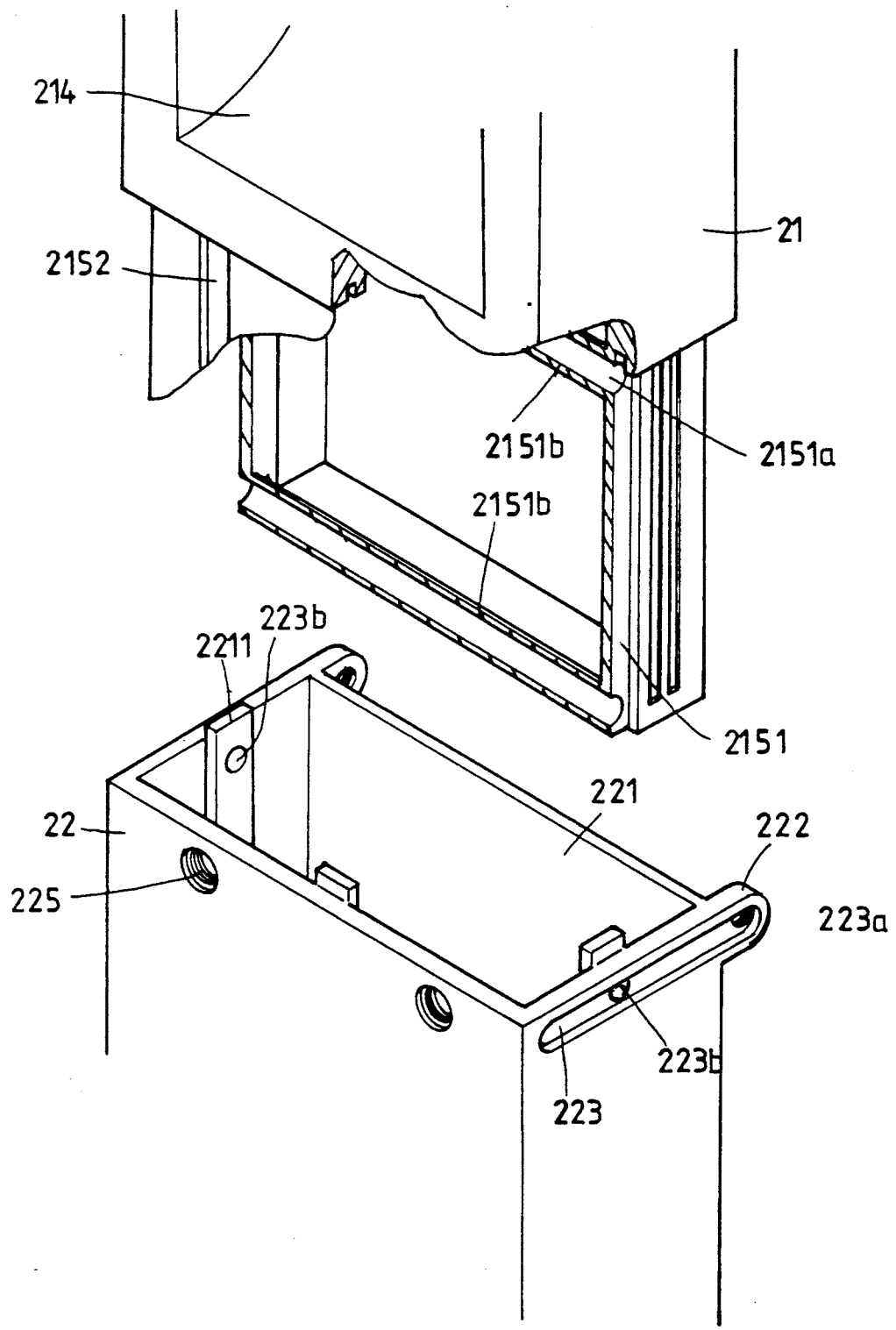
FIG. 5 is a perspective exploded view of the expansible mount.

Referring to FIGS. 1, 2, 3, 4 and 5, an expansible cyclone stove as constructed in accordance with the present invention is generally comprised of a lid 1, an expansible mount 2, and a stove body 3. The lid 1 comprises a control panel 11 on the top, which includes control keys 11a for functional controls and a display unit 11b for functional indications, a handle 12 transversely extended sideways from the control panel 11, a hot air fan 15 on the bottom covered by a perforated covering 16. The perforated covering 16 has a plurality of small holes 161 through the whole body thereof for the transmission of hot air. By threading screws through holes on the perforated covering 16 into screw holes 112 on columns 111 on the lid 1, the perforated covering 16 is fastened to the lid 1. The handle 12 has one end incorporated into the control panel 11 and an opposite end terminated into a downward bend coupled with two spaced bushings 13,14. The bushings 13,14 are different in length, each having a bore 13a or 14a and an outside locating groove 13b or 14b respectively aligned with each other. The expansible mount 2 is consisted of a connecting block 21 and an angle frame 22. The connecting block 21 comprises two top openings 211,212 each having an elongated raised portion 211b or 212a on the inside, a through hole 213 transversely pierced through the top openings 211,212 with two opposite ends terminated into two expanded countersunk holes 211a through which a screw 213a is inserted and locked with a locknut 213b to hold the bushings 13,14 of the lid 1 in the openings 211,212, a curved, transverse slot 214 on the front face thereof at the middle, and a bottom extension 215 having vertical sliding grooves 2151 on the front face and two opposite lateral sides thereof for sliding rails 2211 on the inside of a hole 221 on the angle frame 22 and two parallel grooves 215 spaced from the front face in vertical direction and two opposite sleeves 2151b transversely disposed on the inside. The bore 2151a of each sleeve 2151b has two opposite ends respectively extended to the two lateral side walls of the bottom extension 215 of the connecting block 21. The angle frame 22 has vertical rails 2211 inside a hole 221 thereof respectively fitted into the vertical grooves 2151 on the bottom extension 215 for permitting the bottom extension 215 of the connecting block 21 to be moved in and out of the angle frame 22, a plurality of screw holes 226 on a bottom edge thereof through which screws 226a are respectively threaded to fasten the angle frame 22 to the stove body 3, two screw holes 225 on the front face thereof through which tightening up screws 225a are threaded to stop against the parallel grooves 2152 in holding down the connecting plate 21 in position, through holes 223a, 223b through two elongated transverse grooves 223 on two side projections 222 adjacent to the top edge thereof. By inserting a screw 224 through the through holes 223b and the bore 2151a on either sleeve 2151b and locking it with a locknut 224a, the bottom extension 215 of the connecting block 21 is fastened to the angle frame 22 at the upper limit or lower limit position. The stove body 3 comprises a step 31 around the peripheral surface adjacent to the top edge thereof, a handle 34 and a side block 33 fastened to an outside ring 32 thereof at two opposite locations, which side block 33 has two opposite screw holes 331 to which the through holes 223a on the angle frame 22 are fastened by screws, a plurality of cushions 36 fastened to a bottom plate 35 thereof.

Referring to FIGS. 3 and 4 again, as the lid 1 of lifted, the locating grooves 13b,14b of the bushings 13,14 are respectively engaged with the elongated, raised portions 211b,212a, and therefore the lid 1 is retained perpendicular to the stove body 3.

Figure 7:
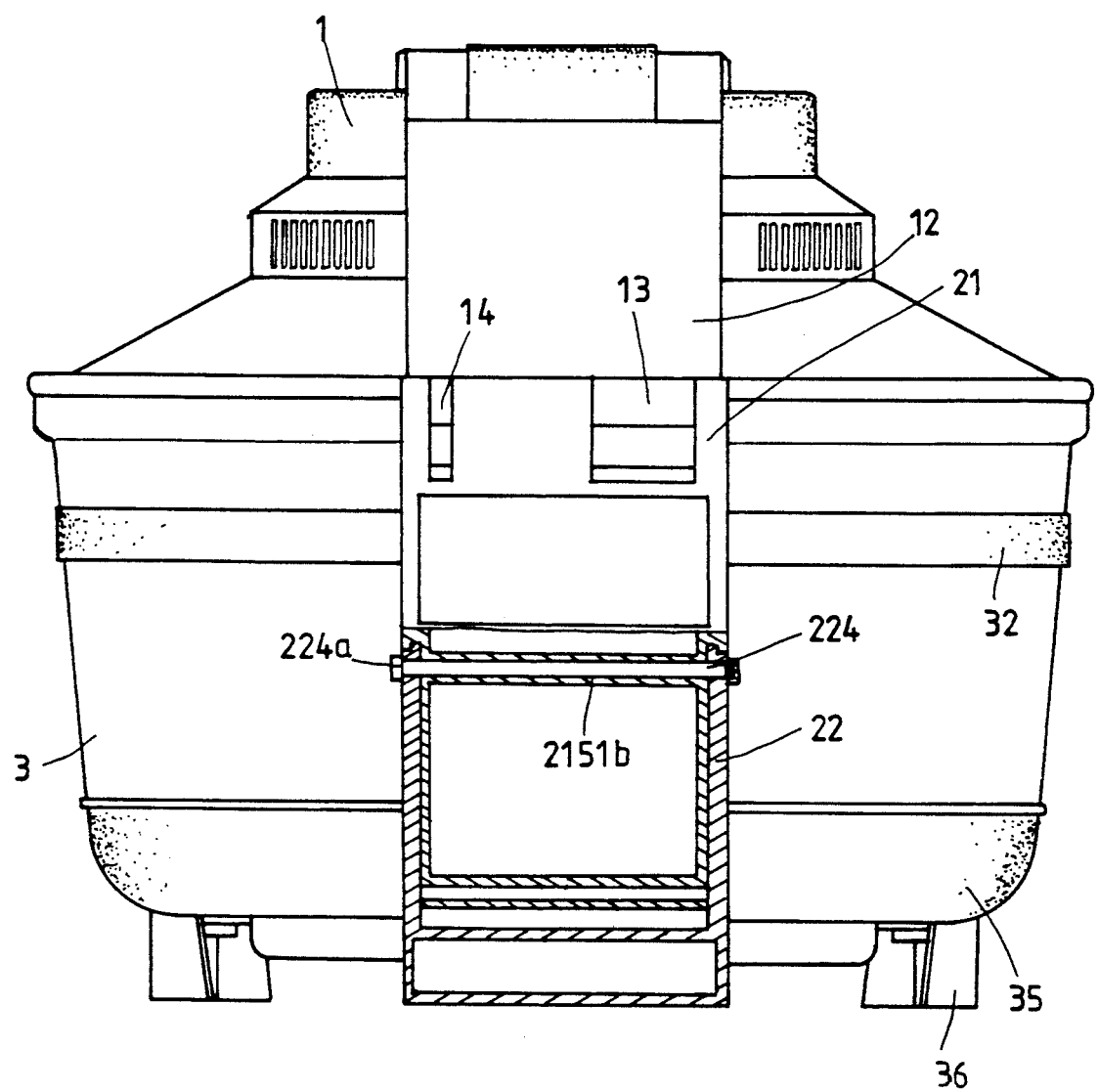
FIG. 7 is a front side sectional view of the expansible mount.
Figure 8:
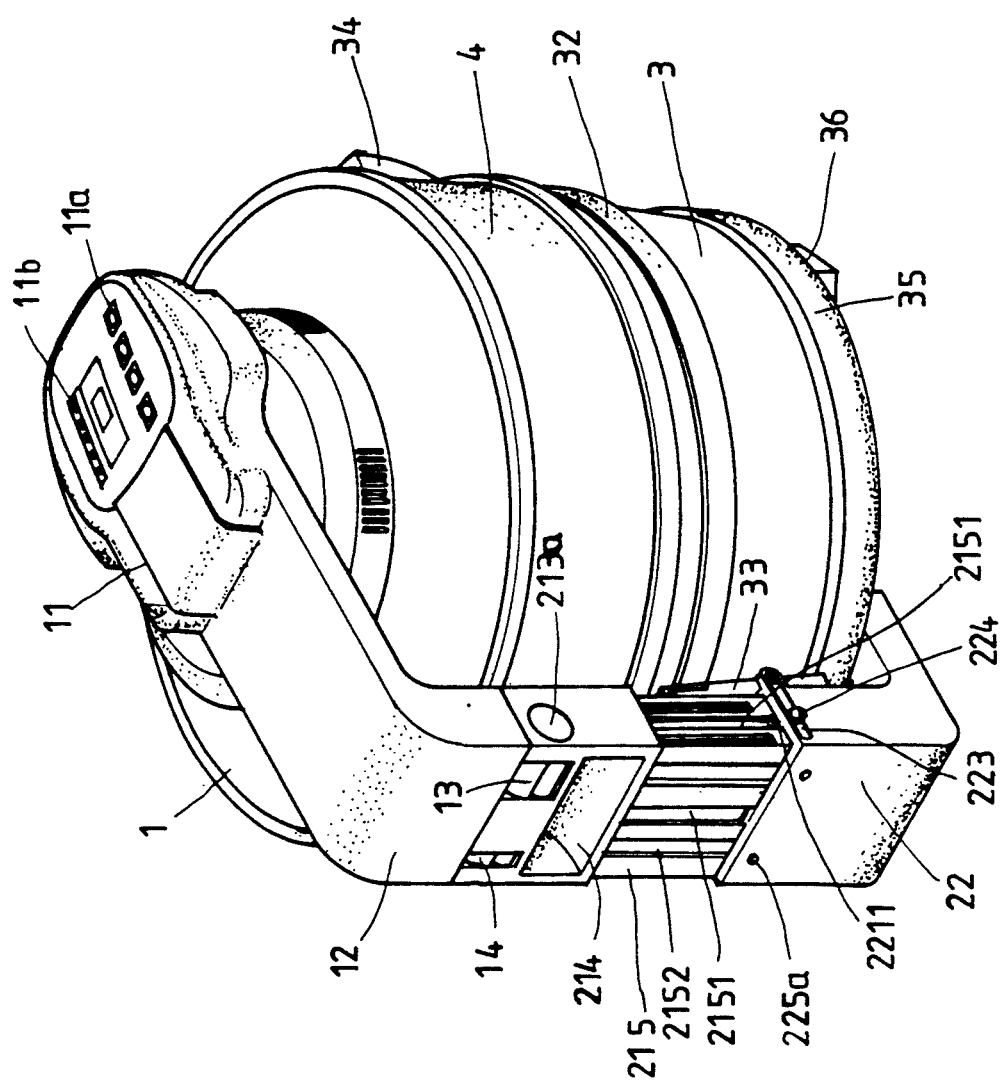
FIG. 8 illustrates the cyclone stove expanded.

Referring to FIGS. 7 and 8 and FIG. 5 again, the bottom extension 215 of the connecting block 21 can be moved up and down in the hole 221 on the angle frame 22 by means of the guide of the rails 2211. By inserting the screw 224 through the through holes 223b on the transverse grooves 223 and the bore 2151a of the sleeve 2151b at the bottom of the bottom extension 215 and locking it with the locknut 224a, the connecting block 21 is fastened to the angle frame 22 at the upper limit position for permitting a cooking container to be put in the stove body 3. On the contrary, by inserting the screw through the through holes 223b on the transverse grooves 223 and the bore 2151a of the sleeve 2151b at the top of the bottom extension 215 and locking it with the locknut 224a, the connecting block 21 is fastened to the angle frame 22 at the lower limit position.

Figure 6:
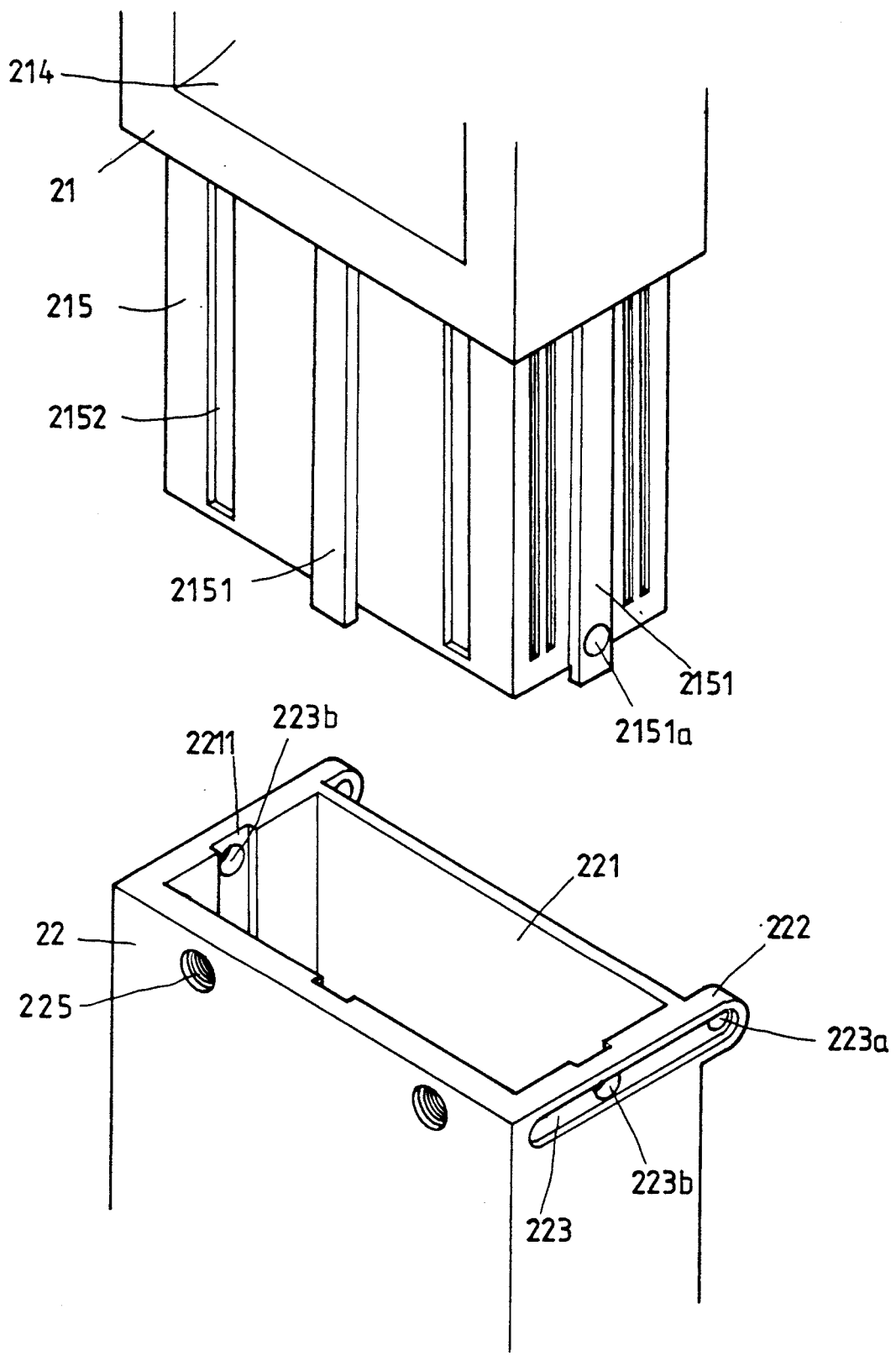
FIG. 6 is an exploded view of an alternate form of the expansible mount.

Referring to FIG. 6, therein illustrated is an alternate form of the expansible mount 2. In this alternate form, rails 2151 are made on the bottom extension 215 of the connecting block 21 and moved to slide on respective grooves 2211 inside the hole 221 on the angle frame 22.

As illustrated, the present invention is to provide an expansible cyclone stove which can be conveniently adjusted to increase its holding space for holding a steamer or the like.

What is claimed is:

1. An expansible cyclone stove comprising:

a lid comprising a control panel on a top edge thereof, which includes control keys and a display unit, a handle traversely extended sideways from said control panel and terminating in a downward bend coupled with two bushings, said lid having a bottom and a hot air fan recessed therein, a plurality of internally threaded columns around said hot air fan, a foraminous covering fastened to said internally threaded columns by screws and covering the recess in the bottom of said hot air fan, said bushings each having an outside locating groove;

a stove body having a step around a peripheral surface adjacent a top edge thereof for mounting a cooking container, a handhold and a side block fastened to an outside ring thereof at two opposite locations, and a plurality of external cushions fastened to a bottom plate thereof by screws, said side block having two opposite screw holes;

an expansible mount comprised of an angle frame fastened to said stove body and a connecting block movably connected between said bushings of said handle of said lid and said angle frame, said angle frame having a bottom bend fastened to the bottom edge of said stove body by screws, a first pair of opposite through holes on two opposite side walls adjacent a top edge thereof respectively fastened to the two opposite screw holes on said side block of said stove body by screws, a chamber on the top edge to receive said connecting block, a second pair of opposite through holes on the two opposite side walls spaced from said first pair of opposite through holes at the same level, and a third pair of opposite through holes on a front face thereof, said connecting block comprising two top openings, which receive said bushings of said handle of said lid and each of which has an elongated raised portion releasably engaged into the locating groove on either bushing for permitting said lid to be retained in a position perpendicular to said stove body, a through hole transversely piercing through said two top openings with two opposite ends terminating in two expanded countersunk holes through which a screw is inserted and locked with a screw to hold said bushings inside said two top openings, and a bottom extension having two transverse sleeves at different levels alternatively fastened between said second pair of opposite through holes inside said angle frame, and two vertical locating grooves on a front face thereof stopped by two screws threaded into said third pair of opposite screws on said angle frame.

2. The expansible cyclone stove of claim 1 wherein said bottom extension of said connecting block has a plurality of vertical sliding grooves spaced on the outside, said angle frame has a plurality of vertical rails spaced on the inside respectively fitted into the vertical sliding grooves on said bottom extension of said connecting block.

3. The expansible cyclone stove of claim 1 wherein said bottom extension of said connecting block has a plurality of vertical rails on the outside respectively movably fitted into respective vertical sliding grooves inside the chamber of said angle frame.

* * * * *